US010788987B2

(12) United States Patent
Foley et al.

(10) Patent No.: US 10,788,987 B2
(45) Date of Patent: Sep. 29, 2020

(54) DATA STORAGE SYSTEM EMPLOYING SERVICE INFRASTRUCTURE FOR FUNCTIONAL MODULES

(71) Applicant: EMC IP Holding Company LLC, Hopkinton, MA (US)

(72) Inventors: Robert P. Foley, Clinton, MA (US); Peter Puhov, Shrewsbury, MA (US); Ashok Tamilarasan, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 352 days.

(21) Appl. No.: 15/797,344

(22) Filed: Oct. 30, 2017

(65) Prior Publication Data

US 2019/0129618 A1 May 2, 2019

(51) Int. Cl.
*G06F 3/06* (2006.01)
(52) U.S. Cl.
CPC .......... *G06F 3/0607* (2013.01); *G06F 3/0635* (2013.01); *G06F 3/0659* (2013.01); *G06F 3/0679* (2013.01); *G06F 3/0689* (2013.01)
(58) Field of Classification Search
CPC .... G06F 3/0607; G06F 3/0689; G06F 3/0679; G06F 3/0659; G06F 3/0635
See application file for complete search history.

(56) References Cited

U.S. PATENT DOCUMENTS

| 7,299,478 | B2 | 11/2007 | Bagsby | |
|---|---|---|---|---|
| 8,930,830 | B2 | 1/2015 | Solaja et al. | |
| 9,430,480 | B1* | 8/2016 | Bono | G06F 3/0635 |
| 2007/0192415 | A1* | 8/2007 | Pak | G06Q 30/02 |
| | | | | 709/206 |

\* cited by examiner

*Primary Examiner* — David Yi
*Assistant Examiner* — Alan Otto
(74) *Attorney, Agent, or Firm* — BainwoodHuang

(57) ABSTRACT

A data storage system includes interface circuitry receiving data storage requests and sending corresponding responses to data storage clients, and data storage devices providing non-volatile storing and retrieval of client data in response to the data storage requests. Processing circuitry executes software-implemented datapath modules that realize datapath functions to process the data storage requests and responses, as well as service infrastructure modules to realize a service infrastructure to provide for regularized communications among the datapath modules, including Notify, Monitor, and StartIO communications. Each datapath module registers with the service infrastructure to establish links into corresponding sub-modules that handle the Notify, Monitor, and Start IO communications, and each datapath module invokes a respective sub-module of another datapath module by performing regularized Notify, Monitor, and Start IO functions of the service infrastructure with an identification of the target datapath module which is to receive the corresponding regularized communication.

18 Claims, 4 Drawing Sheets

DATA STORAGE SYSTEM EMPLOYING SERVICE INFRASTRUCTURE FOR FUNCTIONAL MODULES

BACKGROUND

The present invention is related to the field of data storage systems.

A data storage system includes processing circuitry executing operating software to realize rich, specialized data storage functionality, including for example network file protocols, logical device mapping, RAID, device caching, etc. Like most complex, computer-implemented systems, the operating software is modularized and thus can be viewed as a system of functionally interconnected modules, each realized by computer execution of a corresponding module of computer program instructions.

SUMMARY

In existing data storage systems, there are many functional interconnections among the functional modules realized in the processing circuitry, and the interconnections are largely custom as may be dictated by the design of the modules. Typically the modules are designed to provide module-specific application programming interfaces (APIs), which other modules must utilize in order to functionally interact with each other. The APIs tend not to be regular across different modules, even for similar types of functionality. For example, one module may require a call of a certain type to receive notifications of system events, while another module requires a different type of call, or different parameterization, etc. Thus, as the design of a data storage system evolves over time, it becomes more tightly coupled from a design perspective, reducing scalability, maintainability, etc. This is in spite of the fact that the modules may have quite similar needs and abilities—any such commonality is not exploited in the interest of simplification or regularization.

To address the above and other issues of known data storage systems, a disclosed approach provides for regularization of inter-module communications and other common functions, such as system initialization for example. The disclosed methods and apparatus, can improve modularity, scalability and extensibility, and maintainability among other things.

More particularly, a data storage system is disclosed that includes interface circuitry configured and operative to receive data storage requests from data storage clients and to send corresponding data storage responses to the data storage clients, and data storage devices configured and operative to provide non-volatile storage of client data and retrieval of stored client data in response to the data storage requests. Processing circuitry coupled between the interface circuitry and the data storage devices stores and executes a collection of software-implemented datapath modules that are configured and operative to realize corresponding datapath functions to process the data storage requests and data storage responses.

The processing circuitry further stores and executes service infrastructure modules to realize a service infrastructure to provide for regularized communications among the datapath modules. The regularized communications specifically include a Notify communication, a Monitor communication, and a Start IO communication. Each datapath module initially registers with the infrastructure to establish links into corresponding sub-modules that handle the Notify, Monitor, and Start JO communications respectively, and each datapath module invokes a respective sub-module of another datapath module by performing regularized Notify, Monitor, and Start IO functions of the service infrastructure with an identification of the other datapath module which is to receive the corresponding regularized communication. Through the use of the service infrastructure, module interactions are regularized in a way that enhances modularity, scalability and extensibility, and maintainability of the data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
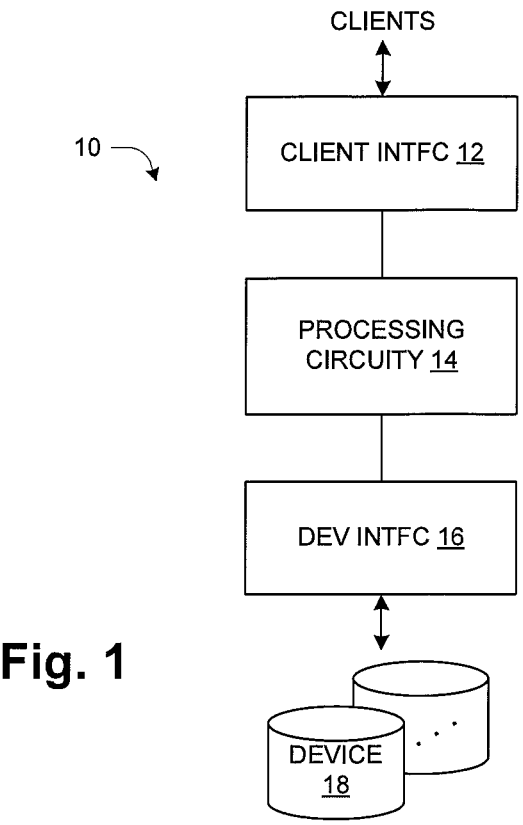
FIG. 1 is a block diagram of a data storage system.

FIG. 1 shows a data storage system 10 including client interface (INTFC) circuitry 12, processing circuitry 14, device interface (DEV INTFC) circuitry 16, and data storage devices 18. The client interface circuitry 12 provides an interface to a data network such as a storage area network (SAN), TCP/IP network, etc., with the clients storing data and accessing stored data by issuing corresponding storage write and read requests over the network to the data storage system 10. In one embodiment the data storage system 10 is realized as a so-called network-attached storage or NAS device, supporting one or more network file system protocols. In other embodiments the data storage system 10 may provide storage as logical or virtualized devices or volumes, using a storage-oriented protocol such as FibreChannel or iSCSI.

In operation, storage requests are received by the client interface circuitry 12 and satisfied by operation of the remaining components. Typically the processing circuitry 14 includes a device cache used to buffer write data and to store prefetched read data for satisfying subsequent data read requests. Requests are generally satisfied out of the cache, which stores data that has been read from or will be written to the devices 18 via the device interface 16. Device reads are typically initiated in response to a read request with a cache miss, and device writes typically occur as background operations when data is destaged from cache to the devices 18.

Figure 2:
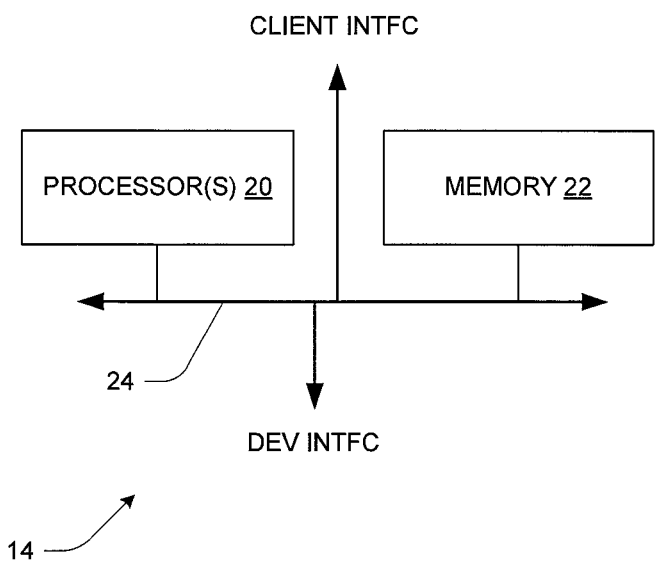
FIG. 2 is a block diagram of processing circuitry from a hardware perspective.

FIG. 2 shows the general structure of the processing circuitry 14 from a hardware perspective. The hardware includes one or more processors 20, memory 22, and data interconnections 24 such as one or more high-speed data buses. In operation, the memory 22 stores data and instructions of system software (e.g., operating system) and one or more application programs which are executed by the processor(s) 20 to cause the hardware to function in a software-defined manner. Thus the computer hardware executing instructions of a data storage application, for example, can be referred to as a data storage circuit or data storage component, and it will be understood that a collection of such circuits or components can all be realized and interact with each other as one or more sets of computer processing hardware executing different computer programs as generally known in the art. Further, the application software may be stored on a separate non-transitory computer-readable medium such as an optical or magnetic disk, Flash memory or other non-volatile semiconductor memory, etc., from which it is retrieved for execution by the processing circuitry, as also generally known in the art.

Figure 3:
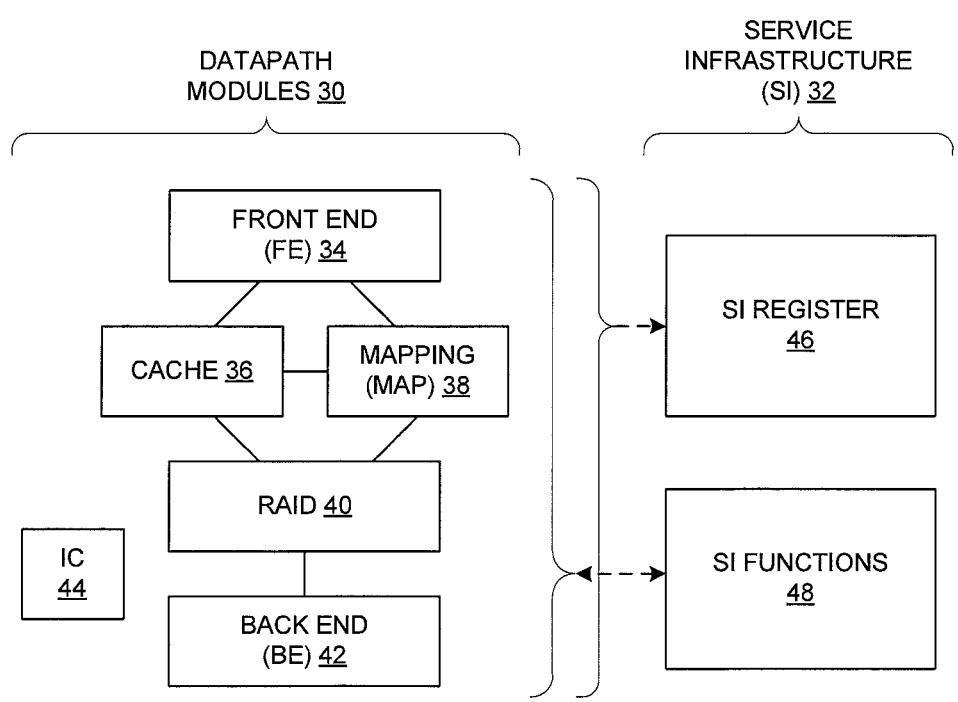
FIG. 3 is a block diagram of processing circuitry from a software perspective.

FIG. 3 shows the processing circuitry 14 from a software perspective, i.e., as a collection of functional modules realized by execution of corresponding computer program instructions stored in the memory 22 (FIG. 2). The modules include datapath modules 30 and modules of a service infrastructure or "SI" 32.

The datapath modules 30 include the following:
Front End (FE) 34
Cache 36
Mapping (Map) 38
RAID 40
Back End (BE) 42
Inter-Node Communication (IC) 44

The SI 32 includes an SI Register 46 and SI Functions 48 as shown.

The datapath modules 30 realize the core functionality of the data storage system 10, i.e., all the functions that contribute directly to processing client read and write requests including accesses to the cache as well as to the devices 18 (FIG. 1). An example is given below to illustrate. The SI 32 provides certain internal services in support of the datapath modules 30. These services contribute to regularization of certain operations, better organization and modularity, ease of design, debugging, revision and maintenance, etc. Specifics are described below.

As an example of operation of the datapath modules 30, processing of a client read request is described. The request is received by the FE 34, which generally accesses either/both the cache 36 or the map 38. As mentioned, in the case of a read hit the data will be obtained from the cache 36, and the FE 34 will send a response to the client with the requested data. The MAP 38 effects a translation between the client-facing representation of the storage (e.g., as a file, logical device (LUN), or volume) and an internal representation understood by the RAID module 40. For a read miss, the map 38 translates the request to the internal representation, and the RAID module 40 works via the back-end 42 to obtain the requested data from the devices 18 (FIG. 1). Typically, an extent or range of data that includes the requested data as well as neighboring data is fetched and stored in the cache 36. The read request is then satisfied from the cache 36, and the pre-fetched data remains in the cache to satisfy subsequent requests until such time as the data may be evicted or otherwise removed from the cache 36.

In one embodiment the data storage system 10 is realized using separate, loosely coupled CPUs referred to as "storage processors" or SPs. In this case, each SP has independent processing hardware (processors and memory) and its own software structure as shown in FIG. 3. In this arrangement, the IC 44 provides for certain communications between/among the SPs, which may also be referred to as "nodes". Inter-node communications may be used in support of redundancy or failover, health monitoring, load balancing, etc.

As suggested in FIG. 3, a data storage system 10 can have many datapath modules 30 that interface and interact with each other. An arrangement in which each module 30 can directly interact with every other module 30 can lead to a complex architecture and tight inter-dependencies. Maintenance and revision become more difficult. Also, as the number of modules 30 increases, the startup, shutdown and normal run time control becomes unduly complicated. In known systems, software modules have various objects and each object has its own interfaces and CPU time slice handler for example, making it difficult just to manage scheduling of execution (use of CPU resources).

Thus, the service infrastructure 32 is provided in order to regularize inter-module interactions and to monitor and control the flow and execution of the datapath modules 30. Within the SI 32, the SI register 46 is used to maintain a register of the datapath modules 30 that are included in the system 10. During initial operation, each module 30 registers with the service infrastructure 32, and a unique, module-specific ID is included in the SI register 46. Additional details are given below. The service infrastructure 32 requires each module 30 to adhere to a common interface that it is required to implement. This gives the flexibility for each module 30 to call another module 30 by this ID. Because all the modules 30 are added to the SI register 46, it is easy for the SI 32 to startup and shutdown a module 30 in an efficient way. Startup and shutdown are but two of a collection of SI functions 48. The SI 32 also provides a scheduling function, referred to as Monitor, allocating CPU resources to each module 30 by calling a monitor entry point for each module 30 in order for them to perform their necessary functionality. In one embodiment, Monitor may give CPU time to a DP Module 30 and let the DP module run however long it wants. Alternatively, Monitor may provide more active and controlled scheduling, e.g., calling DP modules 30 in some sequence and giving each only a certain interval of CPU usage before switching to the next module in the sequence. This monitor may run at a periodic interval which can be modified during run time. Since all these are driven from the SI 32, it is easy to maintain, debug and add new software modules.

Figure 4:
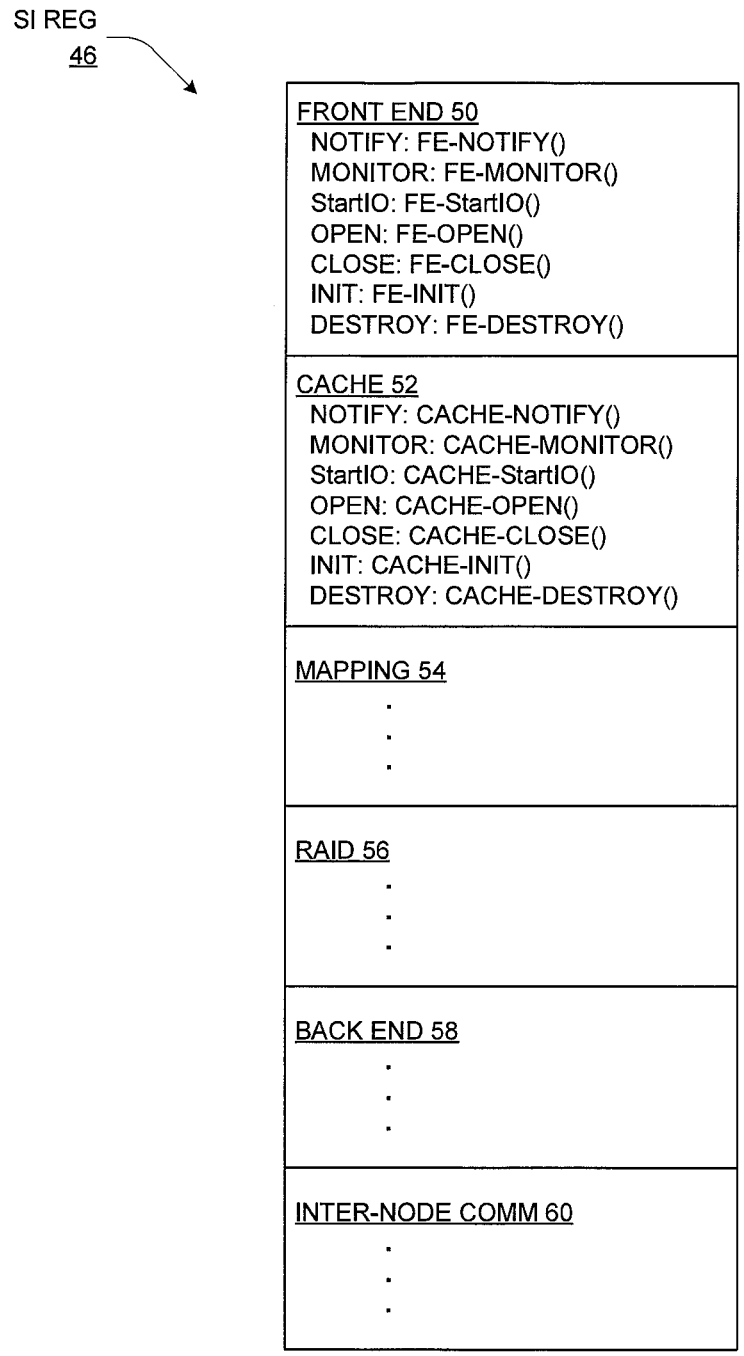
FIG. 4 is a schematic diagram of a service infrastructure register.

FIG. 4 shows the structure and content of the SI register 46. It include respective sections 50, 52, . . . , for corresponding datapath modules (e.g., Front End section 50 for FE module 34, etc.). Each section includes register entries for all regularized functions/operations supported by the SI 32. In one embodiment, the following types of regularized functions are supported:

Notify—send a notification message from one datapath module to another

Monitor—monitor and control execution by this datapath module

StartIO—send an IO-related operation from one datapath module to another

Open—Register for notifications from another datapath module

Close—De-register from notifications from another datapath module

Init—initialize and begin operation of this datapath module

Destroy—stop operation and tear down this datapath module

Each section (50, 52, etc.) includes entries that identify respective sub-modules of the corresponding module 30 that handle the corresponding regularized functions. The identifiers of these sub-modules are indicated in FIG. 4 using an abstracted name, paired with the corresponding regularized function name. Thus the pair "Notify: FE-Notify( )" represents an identifier of the sub-module of the FE 34 that handles the Notify regularized function, and this identifier is stored in a manner that associates it with the Notify regularized function, so that the sub-module identifier can be retrieved and used (by either an SI function 48 or another module 30) as part of the processing of a Notify function directed to the FE module 34. The parentheses in these entries indicate the possibility of parameters being passed. Examples are given below to illustrate.

Figure 5:
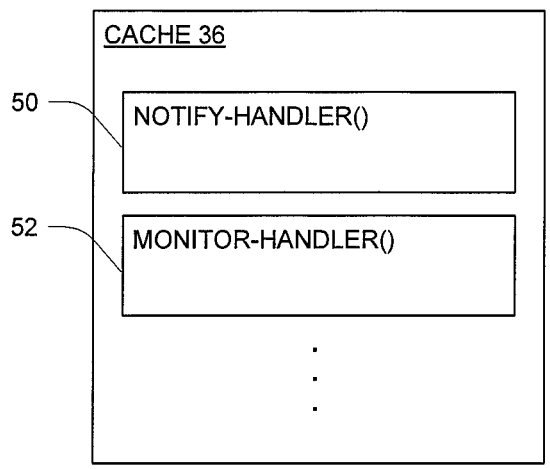
FIG. 5 is a schematic diagram of a cache module.

FIG. 5 illustrates relevant sub-structure of a datapath module 30, in this example of the cache module 36. It includes a variety of sub-modules (or routines) that implement corresponding regularized functions. The illustrated example includes a Notify handler 50 (shown as NotifyHandler( )), a Monitor handler 52 (shown as MonitorHandler( )), etc. Thus the Notify handler 50, for example, participates in both sending notifications to and receiving notifications from another module 30. For receiving notifications, the Notify handler 50 is registered in the cache section 52 of the SI register 46 (FIG. 4), so that it can be invoked by other modules. For sending notifications to other modules 30, the Notify handler 50 issues a Notify call identifying a target module 30 by the name of its Notify handler 50 as registered in the SI register 46. Notifications can be sent directly from one datapath module 30 to another, without requiring any participation by an SI function 48. Other functions, for example Monitoring, generally require involvement of an SI function 48.

Figure 6:
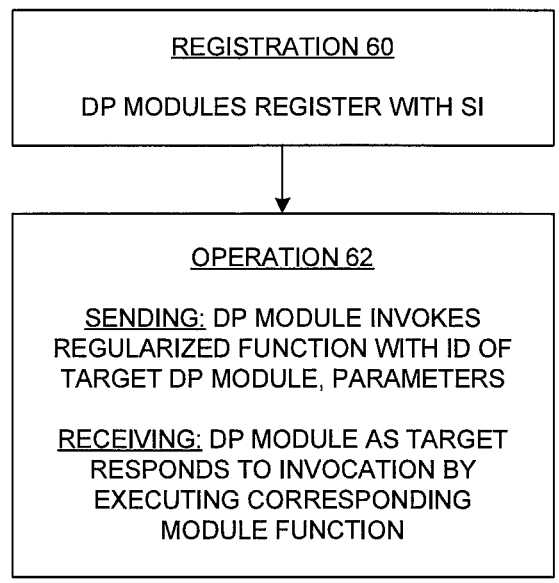
FIG. 6 is a flow diagram of operation.

FIG. 6 shows a flow diagram of operation as it pertains to use of the SI 32 by the datapath modules 30. At 60, the datapath (DP) modules 30 register with the SI 32, by adding entries to the SI register 46 for the regularized functions that they support, such as shown in FIG. 4 for example. Thus a module that supports the Notify function adds an entry with the name of (and parameters for) its notification handler, for example. Registration is performed when a module 30 is added to the system, e.g., during out-of-the-box startup, major re-configuration or replacement, etc. Similarly, modules 30 are de-registered (removed from the SI register 46) whenever they are removed from the system.

At 62, during ensuing operation the SI 32 is used in connection with the regularized functions. In particular this diagram focuses on inter-module communications. A sending DP module 30 invokes a regularized function with an identification of a target DP module 30 for the notification, and parameters used in the notification. A receiving DP module 30, as the target, responds to the invocation by executing the corresponding module function, or sub-module, as described above.

As an example, during operation the RAID module 40 communicates with the BE 42 to initiate disk operations (read, write). For such purposes, the StartIO regular function is used. The RAID module 40 may issue a function call as follows:

StartIO ("Back End", params), where "Back End" identifies the BE module 42 as the target, and the parameters (params) convey the content of the IO operation to be performed (e.g., operation type (read or write), target device ID, starting address, length, etc.). The operating system or other specialized interpretation logic consults the SI register 46 to identify the StartIO handler for the BE 42, represented abstractly as BE-StartIO( ), and calls this function. The BE 42 responds by executing the called function, using the parameters of the call to take the appropriate action (e.g., issue a Read command to the target device, specifying the address and length per the function call).

The following provides additional detail regarding how a DP module 30 uses the SI 32 at run time:
 a. As described above, each DP module 30 defines its entry points (for Init, Monitor, Start, Open, Close and Notify) and the modules registers those entry points with SI 32. SI 32 saves them in the SI register 46.
 b. The SI 32 then in turn defines generic entry points for each of the entry points types, i.e., a generic Monitor entry point, generic Notify entry point, etc.
 c. A DP module 30 that wants to communicate to another DP module 30 calls the generic entry point with the name of the DP module 30 (target) it is communicating with.
 d. The SI 32 based on the name of the target DP module, then calls the appropriate module-specific entry point
  i. As an example, image that the Map 38 wants to send a communication to RAID 40. It calls the generic start routine passing in RAID as the target, e.g., Start_routine(RAID, <some context>). This call goes to SI 32 which in turn calls the appropriate RAID entry. The same is true for other functions.
  ii. Another example is Notify. If the Back End 42 wants to notify the RAID module 40 of an event such as a drive removal or drive addition, it calls the generic Notify routine passing in the target RAID as well as information describing the event being communicated. The SI 32 then calls the appropriate RAID Notify handler which handles the event, i.e., Notify_routine(RAID, event)

As noted above, the SI functions 48 may include a system startup sequencer used to start execution of the datapath modules 30 in a desired manner. This may follow a so-called "bottom up" approach, for example, in which a lower-level object or function is created or started before a higher-level object/function that uses the lower-level item is created or started. Referring to FIG. 3, the BE 42 establishes a population of devices 18, then the RAID module 40 consumes those devices to create higher-level logical devices, which are in turn consumed by the MAP 38 and cache 36.

Among the regularized functions, the Notify, StartIO and Monitor functions play particular roles in providing operation benefits, and each is discussed in some additional detail.

Notify

Notifications are used for one datapath module 30 to notify a peer module 30 of occurrence of an event. Modules register for notifications from other modules, and notifications are sent directly from one module to another, without involvement of any SI function 48. As an example, in a multi-node embodiment, the RAID module 40 on one node may need to know about events involving underlying disk drives that might be detected by the other node. Thus, the RAID module 40 would register for notification from IC 44, using the following for example:

Open(IC, params)

In the above, the Open command indicates that a notification channel is to be created, and "IC" identifies the IC 44 as the endpoint (source of notifications). This operation has the effect of creating a channel for notifications from IC 44 to the RAID module 40. The IC 44 receives notification messages from a peer IC of another node, and forwards these to the local RAID module 40 using the local notification channel.

StartIO As mentioned above, StartIO is used to connection with processing of storage requests such as reads and writes. It is also used to convey so-called "ioctls", i.e., IO control commands that are conveyed from an application to a device 18.

Monitor

Another important function of the SI 32 is scheduling, i.e., controlling the timing of use of computing resources by the datapath modules 30. For this purpose the SI functions 48 may include a monitor thread, which can perform loop-type scheduling based on the listing of modules 30 in the SI register 46. The allocation of resources may be dynamically determined. As an example, if a device 18 fails and it becomes necessary to rebuild a RAID group, the monitor thread may dynamically adjust resource usage to add an allocation of CPU resources to a background rebuild task of the RAID module 40.

While various embodiments of the invention have been particularly shown and described, it will be understood by those skilled in the art that various changes in form and details may be made therein without departing from the scope of the invention as defined by the appended claims.

What is claimed is:

1. A data storage system, comprising:

interface circuitry configured and operative to receive data storage requests from data storage clients and to send corresponding data storage responses to the data storage clients;

data storage devices configured and operative to provide non-volatile storage of client data and retrieval of stored client data in response to the data storage requests; and processing circuitry coupled between the interface circuitry and the data storage devices, the processing circuitry storing and executing a collection of software-implemented datapath modules configured and operative to realize corresponding datapath functions to process the data storage requests and data storage responses, the processing circuitry further storing and executing service infrastructure modules to realize a service infrastructure to provide for regularized communications among the datapath modules, the regularized communications including a Notify communication, a Monitor communication, and a Start IO communication, each datapath module initially registering with the infrastructure to establish links into corresponding sub-modules that handle the Notify, Monitor, and Start IO communications respectively, each datapath module invoking a respective sub-module of another datapath module by performing regularized Notify, Monitor, and Start IO functions of the service infrastructure with an identification of the other datapath module which is to receive the corresponding regularized communication, wherein the service infrastructure includes a service infrastructure (SI) register that maintains a register of the datapath modules, and each datapath module registers with the service infrastructure including a unique, module-specific identifier, and wherein the service infrastructure requires each datapath module to adhere to a common interface, enabling each datapath module to call another module by the module-specific identifier, and wherein the register has respective sections for the datapath modules, each section including entries having identifiers that identify respective sub-modules of the corresponding datapath modules that handles the corresponding regularized functions, the sub-module identifiers being paired with corresponding regularized function names to enable each sub-module identifier to be retrieved and used as part of processing of a corresponding regularized function directed to the datapath module.

2. The data storage system of claim 1, wherein the processing circuitry is organized into separate, loosely coupled storage processors, each having respective processors and memory and storing and executing respective local sets of the datapath modules and service infrastructure modules to realize respective local datapaths and service infrastructures, and wherein the datapath modules include inter-node communications modules providing for communications among the storage processors in support of one or more of redundancy, failover, health monitoring, and load balancing, and wherein the datapath modules of each storage processor register with the local infrastructure to receive event notifications from the local inter-node communications module, the event notifications includes notifications of events occurring on a separate storage processor and communicated to the local inter-node communications module.

3. The data storage system of claim 1, wherein the service infrastructure further includes service infrastructure (SI) functions providing functionality common to some or all the datapath modules.

4. The data storage system of claim 3, wherein the SI functions include startup and shutdown functions used to startup and shutdown operation of the datapath modules.

5. The data storage system of claim 3, wherein the SI functions include a scheduling function allocating processing resources to each datapath module by calling a monitor entry point for each datapath module.

6. The data storage system of claim 5, wherein the scheduling function gives CPU time to a datapath module lets the datapath module run indefinitely.

7. The data storage system of claim 5, wherein the scheduling function calls datapath modules in a sequence and give each module only a certain interval of CPU usage before switching to a next module in the sequence.

8. The data storage system of claim 1, wherein the service infrastructure provides regularized Open and Close operations for registering for and de-registering from notifications from another datapath module.

9. The data storage system of claim 1, wherein the service infrastructure provides regularized Init and Destroy operations for initializing and stopping operation of a datapath module.

10. A method of operating processing circuitry of a data storage system having (i) interface circuitry configured and operative to receive data storage requests from data storage clients and to send corresponding data storage responses to the data storage clients, and (ii) data storage devices configured and operative to provide non-volatile storage of client data and retrieval of stored client data in response to the data storage requests, the method comprising:

storing and executing a collection of software-implemented datapath modules configured and operative to realize corresponding datapath functions to process the data storage requests and data storage responses; and storing and executing service infrastructure modules to realize a service infrastructure to provide for regularized communications among the datapath modules, the regularized communications including a Notify communication, a Monitor communication, and a Start IO communication, each datapath module initially registering with the infrastructure to establish links into corresponding sub-modules that handle the Notify, Monitor, and Start IO communications respectively, each datapath module invoking a respective sub-module of another datapath module by performing regularized Notify, Monitor, and Start IO functions of the service infrastructure with an identification of the other datapath module which is to receive the corresponding regularized communication, wherein the service infrastructure includes a service infrastructure (SI) register that maintains a register of the datapath modules, and each datapath module registers with the service infrastructure including a unique, module-specific identifier, and wherein the service infrastructure requires each datapath module to adhere to a common interface, enabling each datapath module to call another module by the module-specific identifier, and wherein the register has respective sections for the datapath modules, each section including entries having identifiers that identify respective sub-modules of the corresponding datapath modules that handles the corresponding regularized functions, the sub-module identifiers being paired with corresponding regularized function names to enable each sub-module identifier to be retrieved and used as part of processing of a corresponding regularized function directed to the datapath module.

11. The method of claim 10, wherein the processing circuitry is organized into separate, loosely coupled storage processors, each having respective processors and memory and storing and executing respective local sets of the datapath modules and service infrastructure modules to realize respective local datapaths and service infrastructures, and wherein the datapath modules include inter-node communications modules providing for communications among the storage processors in support of one or more of redundancy, failover, health monitoring, and load balancing, and wherein the registering includes, by the datapath modules of each storage processor, registering with the local infrastructure to receive event notifications from the local inter-node communications module, the event notifications includes notifications of events occurring on a separate storage processor and communicated to the local inter-node communications module.

12. The method of claim 10, wherein the service infrastructure further includes service infrastructure (SI) functions providing functionality common to some or all the datapath modules.

13. The method of claim 12, wherein the SI functions include startup and shutdown functions used to startup and shutdown operation of the datapath modules.

14. The method of claim 12, wherein the SI functions include a scheduling function allocating processing resources to each datapath module by calling a monitor entry point for each datapath module.

15. The method of claim 14, wherein the scheduling function gives CPU time to a datapath module lets the datapath module run indefinitely.

16. The method of claim 14, wherein the scheduling function calls datapath modules in a sequence and give each module only a certain interval of CPU usage before switching to a next module in the sequence.

17. The method of claim 10, wherein the service infrastructure provides regularized Open and Close operations for registering for and de-registering from notifications from another datapath module.

18. The method of claim 10, wherein the service infrastructure provides regularized Init and Destroy operations for initializing and stopping operation of a datapath module.

* * * * *